United States Patent
Niu et al.

(10) Patent No.: US 12,534,639 B2
(45) Date of Patent: Jan. 27, 2026

(54) MICHAEL ADDITION CURABLE COMPOSITION, COATING COMPOSITION CONTAINING THE SAME, AND COATED ARTICLE

(71) Applicant: GUANGDONG HUARUN PAINTS CO., LTD, Foshan (CN)

(72) Inventors: Song Niu, Foshan (CN); Shigang Fan, Foshan (CN); Xing Guan, Foshan (CN)

(73) Assignee: SHERWIN-WILLIAMS (GUANGDONG) NEW MATERIAL CO., LTD., Guangdong (CN)

( * ) Notice: Subject to any disclaimer, the term of this patent is extended or adjusted under 35 U.S.C. 154(b) by 585 days.

(21) Appl. No.: 17/744,892

(22) Filed: May 16, 2022

(65) Prior Publication Data
US 2023/0002635 A1    Jan. 5, 2023

(30) Foreign Application Priority Data

Jun. 10, 2021 (CN) .......................... 202110648304.9

(51) Int. Cl.
| | | |
|---|---|---|
| B32B 9/00 | (2006.01) | |
| C08G 63/20 | (2006.01) | |
| C08G 63/85 | (2006.01) | |
| C08G 63/91 | (2006.01) | |
| C09D 167/02 | (2006.01) | |

(52) U.S. Cl.
CPC ........... *C09D 167/02* (2013.01); *C08G 63/20* (2013.01); *C08G 63/85* (2013.01); *C08G 63/916* (2013.01)

(58) Field of Classification Search
CPC ...... C09D 167/00; C08G 63/02; C08G 63/85; C08G 63/916
USPC .......................................................... 428/408
See application file for complete search history.

(56) References Cited

U.S. PATENT DOCUMENTS 6,037,413 A * 3/2000 Kitahara ................. C08L 23/16
525/445

FOREIGN PATENT DOCUMENTS

| CN | 100451082 | | 1/2009 |
|---|---|---|---|
| CN | 100526343 | | 8/2009 |
| CN | 105061745 | A | 11/2015 |
| CN | 107646050 | A | 1/2018 |
| CN | 107667151 | | 2/2018 |
| CN | 110105799 | A | 8/2019 |
| EP | 1970408 | A1 * | 9/2008 |
| EP | 2374836 | A1 | 10/2011 |
| WO | 2020224519 | A1 | 11/2020 |

OTHER PUBLICATIONS

Brinkhuis, et al. "Taming the Michael Addition Reaction" European Coatings Journal, May 2015, 7 pages.
Third Party Observations from related European Patent Application No. 22729416.2 dated Nov. 11, 2024.

* cited by examiner

*Primary Examiner* — Daniel H Miller
(74) *Attorney, Agent, or Firm* — Tucker Ellis LLP

(57) ABSTRACT

The present application relates to a Michael Addition curable composition, coating composition containing the same and coated article made therefrom. In particular, the Michael Addition curable composition comprises at least one reactive donor capable of providing two or more nucleophilic carbanions; at least one reactive acceptor comprising two or more carbon-carbon double bonds; and at least one catalyst for catalyzing a Michael Addition crosslinking reaction between the at least one reactive donor and the at least one reactive acceptor, wherein the at least one reactive donor comprises at least one branched polyester comprising at least one polyester backbone and at least one —C(O)—CH$_2$—C(O)-moiety; wherein the at least one polyester backbone is derived from an alcohol component comprising at least one alcohol having at least three hydroxyl groups; and wherein the at least one branched polyester has a —C(O)—CH$_2$—C(O)-moiety equivalent of no more than 700 g/mol.

29 Claims, No Drawings

US 12,534,639 B2

MICHAEL ADDITION CURABLE COMPOSITION, COATING COMPOSITION CONTAINING THE SAME, AND COATED ARTICLE

TECHNICAL FIELD

The present application relates to a curable composition. More specifically, the present application relates to a Michael Addition curable composition and its application, involving a coating composition containing the composition and a coated article made therefrom.

BACKGROUND

Due to increasingly strict environmental regulations, the standards for free diisocyanates (such as toluene diisocyanate TDI) and volatile organic compound (VOC) emission in industrial applications have become more and more stringent as free TDI is extremely harmful to human body and environment protection. Therefore the technology on non-isocyanate (NICN) curing without any free TDI has gained great attention in academic and industrial fields.

To date, there have been several potentially curable methods by NICN in industrial applications, for example including a polycarbodiimide (PCDI) curing system, a Michael Addition curing system and so on. The PCDI curing system, however, is hardly commercialized on account of its short pot-life at this stage. Currently, the Michael Addition curing system has been widely applied in industry fields. Meanwhile, this Michael Addition curing system has many attractive advantages, including: (1) capable of curing at ambient temperatures, even lower temperature; (2) very low solvent content such as VOC<250 g/l; (3) very long pot-life such as a pot life of >8 hours at 23° C.; (4) excellent appearance such as gloss @60° of >90 and DOI>90; (5) capable of applying at a thick layer, such as with as a thickness of >150 µm; (6) very good chemical resistance; (7) excellent flexibility; (8) good outdoor durability; and (9) free of isocyanate; formaldehyde and organotin. Thus, there has been a strong demand for this Michael Addition curing system in market.

In terms of composition, a Michael addition-curable system is usually composed of a reactive donor, a reactive acceptor, a catalyst for catalyzing the Michael addition crosslinking reaction between the reactive donor and the reactive acceptor, and other additional components. At present, the research on this curing system mainly focuses on the catalyst and the additional components, and the research on the reactive donor and reactive acceptor is very limited. In the disclosed Michael addition-curable systems, the reactive donors and reactive acceptors are mostly polymers with linear structures, providing reactive active hydrogens and unsaturated carbon-carbon double bonds, respectively. In many applications, paint films formed by the Michael addition reaction curing system have the problems of low hardness and slow drying speed, which cannot meet the growing market requirements for the performance of coating compositions, especially curing performance and coating performance.

Therefore, there is a need in industry for an improved Michael Addition curable system.

SUMMARY

In one aspect, the present application discloses a Michael Addition curable composition, comprising:
at least one reactive donor capable of providing two or more nucleophilic carbanions;
at least one reactive acceptor comprising two or more carbon-carbon double bonds; and
at least one catalyst for catalyzing the Michael Addition crosslinking reaction between the at least one reactive donor and the at least one reactive acceptor;
wherein the at least one reactive donor comprises at least one branched polyester comprising at least one polyester backbone and at least one —C(O)—CH$_2$—C(O)-moiety; wherein the at least one polyester backbone is derived from an alcohol component comprising at least one alcohol having at least three hydroxyl groups; and wherein the at least one branched polyester has a —C(O)—CH$_2$—C(O)-moiety equivalent of no more than 700 g/mol. Preferably, the at least one branched polyester has a —C(O)—CH$_2$—C(O)-moiety equivalent of no more than 600 g/mol, preferably of no more than 500 g/mol, more preferably of no more than 400 g/mol and even more preferably of no more than 240 g/mol and at least 200 g/mol. Preferably, the at least one branched polyester has a —C(O)—CH$_2$—C(O)-moiety equivalent in a range of 200-600 g/mol, preferably in a range of 200-500 g/mol, more preferably in a range of 200-400 g/mol and even more preferably in a range of 200-240 g/mol.

In some embodiments of the present application, the at least one reactive donor comprises at least one first branched polyester, at least one second branched polyester, or combinations thereof, wherein the at least one first branched polyester comprises at least one polyester backbone derived from an alcohol component comprising at least one alcohol having at least three hydroxyl groups, and at least one —C(O)—CH$_2$—C(O)-moiety covalently incorporated into the polyester backbone; and wherein the at least one second branched polyester comprises at least one polyester backbone derived from an alcohol component comprising at least one alcohol having at least three hydroxyl groups and at least one —C(O)—CH$_2$—C(O)-moiety covalently bonded to a terminal of the polyester backbone. Preferably, the at least one reactive donor comprises a combination of at least one first branched polyester with at least one second branched polyester.

In some embodiments of the present application, the Michael Addition curable composition may be used for manufacture of coatings, adhesives, sealing agents, foaming materials, films, molded products or inks.

In another aspect, the present application provides a coating composition, comprising the Michael Addition curable composition according to the present application.

In some embodiments of the present application, the coating composition is substantially free of matting agent.

In some embodiments of the present application, the coating composition may form a coating having a gloss of no higher than 60 at 60°, preferably no higher than 55 at 60°, more preferably no higher than 50 at 60°, even more preferably no higher than 45 at 60°, still even more preferably no higher than 40 at 60°, and the most preferably in the range of 20-30 at 60°, as measured with a Sheen gloss meter. Preferably, the coating composition is substantially free of any matting agent.

In some embodiments of the present application, the coating composition may form a coating wherein a portion scratches of the coating is capable of self-healing within 2 hours. That is, the painting film has a self-healing performance. Preferably, the painting film formed from the coating composition may self-heal at least 50% of its scratches thereon within 2 hours.

In another aspect, the present application provides a coated article comprising a substrate having at least one major surface; and a cured coating at least of which is formed from the coating composition of the present application directly or indirectly applied on the major surface. Preferably, the substrate comprises wood, metal, plastic, ceramic, cementitious board or any combination thereof.

In the present application, the applicant has successfully synthesized branched polyesters with a specific —C(O)—CH$_2$—C(O)-moiety equivalent (i.e. a high active hydrogen content), and successfully applied them to the Michael addition curable system as a reactive donor. The resulting Michael addition-curable system has a faster cure rate. For example, its tack-free time can be controlled within an appropriate period of time, such as within 1.5 hours. Moreover, the resulting coating exhibits comparable coating performance to the existing Michael addition-curable System. Furthermore, it was further surprisingly found in the formulation of the Michael addition curable system according to the present application, combining two branched polyesters each having a different structure and a specific —C(O)—CH$_2$—C(O)-moiety equivalent to form a reactive donor can obtain a low-gloss coating film without adding an additional matting agent, and even realize self-matting of the coating film, meanwhile, the paint film is capable of self-healing, which is unforeseeable prior to the present application.

In addition, the applicant of the present application has successfully synthesized a branched polyester with the above-mentioned specific —C(O)—CH$_2$—C(O)-moiety equivalent derived from alkyl malonates by a one-step method for the first time, which branched polyester has a specific molecular structure in which the —C(O)—CH$_2$—C(O)-moiety is covalently incorporated into the polymer backbone. The acquisition of polymers with this new structure expands the window of reactive donors for the Michael addition-curable compositions, and enhances the application prospects of the Michael addition-curable systems.

The details of one or more embodiments are set forth in the description below. Other features, objects, and advantages will be apparent from the description, and from the claims.

Definition

As used herein, "a", "an", "the", "at least one", and "one or more" are used interchangeably. Thus, for example, a coating composition that comprises "an" additive can be interpreted to mean that the coating composition includes "one or more" additives.

Throughout the present application, where compositions are described as having, including, or comprising specific components or fractions, or where processes are described as having, including, or comprising specific process steps, it is contemplated that the compositions or processes as disclosed herein may further comprise other components or fractions or steps, whether or not, specifically mentioned, as along as such components or steps do not affect the basic and novel characteristics of what is disclosed, but it is also contemplated that the compositions or processes may consist essentially of, or consist of, the recited components or steps.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

As used herein, the term "Michael Addition" refers to the nucleophilic addition of a carbanion provided by a reactive donor to an electrophilic conjugated system such as carbon-carbon double bond of a reactive acceptor. A Michael Addition reaction follows the general reaction schematic shown here:

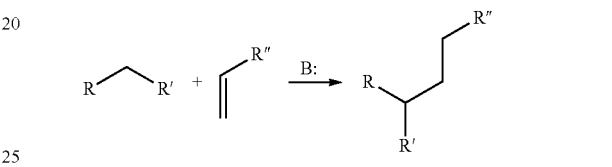

In the reaction schematic shown above, substituents R and R' on the reactive donor are electron-withdrawing groups, so that the hydrogen on methylene of the reactive donor can be deprotonated and form a carbanion in the presence of a catalyst B: and the reactive acceptors usually comprise α, β-unsaturated ketones, aldehydes, carboxylic acids, esters, nitriles, nitro and other compounds.

The term "nucleophilic carbanion" in the context of "a reactive donor", refers to an active intermediate of carbon with a lone pair of electrons to which two or three strong electronegative groups are attached. The strong electronegative groups may include, but not limited to, —NO$_2$, —C(=O)—, —CO$_2$R$_1$, —SO$_2$—, —CHO, —CN, and —CONR$_2$, and the like, wherein R$_1$ and R$_2$ each independently represent an alkyl group. In some embodiments of the present application, the nucleophilic carbanion is derived from an acidic proton C—H in activated methylene or methine group.

As used herein, the term "branched polyester" refers to a macromolecule defined as a polymer having a branched structure and a polyester backbone, the branched structure being distinct from a linear polymer structure, including star structure, H-shaped structure, comb structure, hyperbranched structure, dendritic structure, etc., which polymer contains at least one branch point connecting at least three polymer segments. Polymers with a branched structure usually have the characteristics of low viscosity, high solubility, and high reactivity.

The term "—C(O)—CH$_2$—C(O)-moiety equivalent" in the context of "branched polyester", refers to a resin mass containing 1 mol of —C(O)—CH$_2$—C(O)-moiety. The higher the equivalent, the lower the content of active hydrogen functional groups is; and the lower the equivalent, the higher the content of active hydrogen functional groups is. In an embodiment of the present application, "—C(O)—CH$_2$—C(O)-moiety equivalent" is calculated by subtracting the small molecular species produced by the reaction from all raw materials used for the preparation of resin, including but not limited to "water" and "alcohols" to obtain the total mass of resin, and then calculating the mass of resin containing 1 mol of —C(O)—CH$_2$—C(O)-moiety based on the molar amount of raw materials containing —C(O)—CH$_2$—C(O)-moiety, i.e. the —C(O)—CH$_2$—C(O)-moiety equivalent of the resulting resin.

The term "aromatic polyester backbone" in the context of "branched polyester" refers to a backbone structure comprising the branched polyester having a closed aromatic ring or ring system therein which closed aromatic ring or ring system is rigid, unlike flexible alkyl or cycloalkyl groups such as cyclohexyl. Examples of such aromatic ring structures include, but are not limited to, phenylene, naphthylene, biphenylene, fluorenylene, and indenyl, as well as heteroarylenes (e.g., closed aromatic or aromatic cyclic hydrocarbon or ring system in which one or more atoms in the ring is an element other than carbon such as nitrogen, oxygen, sulfur, etc.).

The term "carboxylic acid component" in the context of "branched polyester" is defined as a component consisting of at least one compound capable of providing a carboxylic acid group or a potential carboxylic acid group. Thus, in the present application, "a compound capable of providing a carboxylic acid group or a potential carboxylic acid group" includes not only the carboxylic acid itself, but also its ester-forming derivatives, that is, compounds capable of reacting with an alcohol component to form a carboxylate ester. Ester-forming derivatives of carboxylic acids are known to those skilled in the art and include carboxylic acid anhydrides, acid halides, esters of carboxylic acids with lower alkanols, or the like. In some embodiments of the present application, the carboxylic acid component comprises at least one aromatic carboxylic acid alkyl ester. In other embodiments of the present application, the carboxylic acid component comprises at least one aromatic carboxylic acid anhydride.

The term "carboxy functional group" in the context of "carboxylic acid component" or "carboxylic ester component", refers to a functional group capable of esterification or transesterification with a hydroxyl group (—OH), including but not limited to —COOH, —COX where X is a halogen such as Cl, —COR where R is a C1-C6 alkyl, or the like. When the aromatic carboxylic acid is an aromatic carboxylic acid anhydride, its two carboxyl functional groups are linked together to form a structure represented by —CO(O)OC—.

The term "hydroxyl functional group" in the context of "alcohol component", refers to a "—OH" functional group attached to an alkyl group, which is capable of carrying out esterification with a carboxylic acid and transesterification with a carboxylic ester.

The term "carbon-carbon double bond" in the context of "a reactive acceptor", refers to a structure containing a carbon-carbon double bond in its molecule, excluding a benzene ring. Examples of a carbon-carbon double bond include, but are not limited to, —C=C—C=C—, —C=C—C≡C—, —C=C—CHO, —C=C—CO—, —C=CC(O)O—, —C=C—CN.

In the context of the present application, the term "matting agent" includes silica-based matting agents, synthetic wax matting agents and stearate-based matting agents, as well as various organic matting agents such as polymethyl methacrylate (PMMA) matting agents. In some embodiments of the present application, the coating composition is substantially free of matting agents. In such embodiments, the phrase "the coating composition is substantially free of matting agents" means that the components of the coating composition and the coating compositions formulated do not contain any additionally added matting agents as described above, preferably do not contain any matting agents known in the art. When the phrase "substantially free" is used herein, such phrases are not intended to exclude the presence of a trace amount of related matting powders that may be present as environmental pollutants or due to environmental contamination. In other embodiments of the present application, the coating composition may also contain a matting agent.

The term "substantially free" of certain component in the context of "coating composition" means that the coating composition of the present application contains no more than 0.1% by weight, preferably no more than 0.05% by weight, more preferably not more than 0.01% by weight of said components based on the total weight of the coating composition.

When referring to "Michael addition-curable composition", the term "tack-free time" means that the time required for the resulting coating as obtained by mixing the components of the composition at a specific temperature to form a mixture and applying the mixture to the test substrate in a specific wet coating thickness (for example, 100 μm) to reach not to stick hands, for example, by touching. In some embodiments, the tack-free time can also be tested by other methods known in the art.

When referring to "Michael addition-curable composition", the term "gel time" refers to the time required for the resulting mixture as obtained by mixing the components of the composition at a specific temperature to reach a non-flowable gel state. In an embodiment of the present application, the gel time is a parameter used to measure constructability of the Michael addition curable system.

The term "main surface", when used in the context of a substrate, refers to a surface formed by certain lengthwise and widthwise dimensions of the substrate for providing decoration.

The term "on", when used in the context of a coating composition applied on a main surface of substrate, includes the coating composition applied directly or indirectly to the main surface of substrate. In some embodiments of the present application, the coating composition according to the present application is applied directly to a main surface of substrate to form a coating. In some embodiments of the present application, there be one or more barrier layers or adhesion promoting layers between the coating composition and substrate.

As used herein, when it is described that the paint film or coating has a "self-healing" function, it means that after the paint film or coating is scratched on its surface due to external force, it can repair by itself at least part of the scratches within a certain period of time, such as at least 50% of scratches within 2 hours. The repaired percentage refers to the percentage of void volume of scratches filled in the repairing process to the void volume of scratches upon being generated.

The term "comprises", "comprising", "contains" and variations thereof do not have a limiting meaning where these terms appear in the description and claims.

The terms "preferred" and "preferably" refer to embodiments that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of what is disclosed.

DETAILED DESCRIPTION

The present embodiments in one aspect disclose a Michael Addition curable composition, comprising:
- at least one reactive donor capable of providing two or more nucleophilic carbanions;
- at least one reactive acceptor comprising two or more carbon-carbon double bonds; and
- at least one catalyst for catalyzing the Michael Addition crosslinking reaction between the at least one reactive donor and the at least one reactive acceptor;
- wherein the at least one reactive donor comprises at least one branched polyester comprising at least one polyester backbone and at least one —C(O)—CH$_2$—C(O)-moiety; wherein the at least one polyester backbone is derived from an alcohol component comprising at least one alcohol having at least three hydroxyl groups; and wherein the at least one branched polyester has a —C(O)—CH$_2$—C(O)-moiety equivalent of no more than 700 g/mol. Preferably, the at least one branched polyester has a —C(O)—CH$_2$—C(O)-moiety equivalent of no more than 600 g/mol, preferably of no more than 500 g/mol, more preferably of no more than 400 g/mol and even more preferably of no more than 240 g/mol and at least 200 g/mol. Preferably, the at least one branched polyester has a —C(O)—CH$_2$—C(O)-moiety equivalent in a range of 200-600 g/mol, preferably in a range of 200-500 g/mol, more preferably in a range of 200-400 g/mol and even more preferably in a range of 200-240 g/mol.

Reactive Donor

According to embodiments of the present application, the Michael Addition curable composition comprises at least one reactive donor capable of providing two or more nucleophilic carbanions. As described above, the nucleophilic carbanion refers to an active intermediate of carbon with a lone pair of electrons to which two or three strong electronegative groups are typically attached. As an example of the strong electronegative groups, it may be selected from one or more of the following —NO$_2$, —C(=O)—, —CO$_2$R$_1$, —SO$_2$—, —CHO, —CN, and —CONR$_2$, and the like, wherein R$_1$ and R$_2$ each independently represent an alkyl group.

In an embodiment of the present application, the reactive donor comprises at least one branched polyester. The branched polyester has a branch structure and also contains a certain amount of —C(O)—CH$_2$—C(O)-moiety, for example, with an —C(O)—CH$_2$—C(O)-moiety equivalent of no more than 700 g/mol, to provide nucleophilic carbanions so as to function as a reactive donor. It was surprisingly found that the Michael addition-curable system composed of this reactive donor has a faster curing speed, for example, its tack-free time can be controlled within an appropriate time period, for example, within 1.5 hours.

In an embodiment, the branched polyester has a branch structure, and its backbone structure is derived from an alcohol component comprising a polyol, wherein an alcohol having at least three hydroxyl functional groups in the alcohol component serves as a core of the branched polyester, leading to the formation of branched structures. Therefore, in the synthesis of the branched polyester, an alcohol having at least three hydroxyl functions are one of the essential components.

In an embodiment, the branched polyester also has a certain amount of —C(O)—CH$_2$—C(O)-moiety, thereby enabling it to act as a reactive donor in the Michael addition-curable system. Specifically, the —C(O)—CH$_2$—C(O)-moiety equivalent of the branched polyester according to the present application is set within a specific range. It was found that the —C(O)—CH$_2$—C(O)-moiety equivalent of the branched polyester as a reactive donor is directly relevant to the curing speed of coating. The higher the equivalent, the lower the content of active hydrogen functional groups is, thereby enabling the coating formed therefrom to have relatively lower curing rate; the lower the equivalent, the higher the content of active hydrogen functional groups is, thereby enabling the coating formed therefrom to have relatively higher curing rate. According to some embodiments of the present application, the branched polyester has a —C(O)—CH$_2$—C(O) moiety equipment of no more than 600 g/mol, preferably of no more than 500 g/mol, more preferably of no more than 400 g/mol, and even more preferably of no more than 240 g/mol and has a —C(O)—CH$_2$—C(O) moiety equipment of at least 200 g/mol. Preferably, the at least one branched polyester has a —C(O)—CH$_2$—C(O)-moiety equivalent in a range of 200-600 g/mol, preferably in a range of 200-500 g/mol, more preferably in a range of 200-400 g/mol and even more preferably in a range of 200-240 g/mol.

In some embodiments according to the present application, the branched polyester as a reactive donor comprises an aromatic polyester backbone. As mentioned above, the polyester backbone of the reactive donor has a rigid aromatic structure. It was surprisingly found that introduction of an aromatic ring or aromatic ring system with a rigid structure in the polyester backbone of the reactive donor can reduce gelling of branched polyesters during polymerization and can also provide cured coatings with improved hardness, relative to the Michael addition-curable coating with a flexible alkyl or cycloalkyl. Preferably, the aromatic polyester backbone is derived from aromatic carboxylic acids. As mentioned above, the aromatic carboxylic acids refer to an aromatic carboxylic acid component capable of providing carboxylic acid groups or potential carboxylic acid groups, including but not limited to aromatic carboxylic acids, carboxylic acid anhydrides, acid halides, esters of carboxylic acids and lower alkanols or analogs.

In some embodiments according to the present application, the branched polyester as a reactive donor has a relatively low viscosity as measured by IWATA NK-2 at 25° C. It was found that a lower viscosity of the branched polyester as a reactive donor is advantageous for improving applicability of the resulting coating. In one embodiment, the branched polyester has a viscosity of less than 2000 mPa·s, preferably of less than 1800 mPa·s, more preferably of less than 1500 mPa·s, still more preferably of less than 1200 mPa·s, and even more preferably of less than 1000 mPa·s, as measured with IWATA NK-2 at 25° C. However, considering the practical application, especially application efficiency of the coating, the viscosity of the branched polyester as a reactive donor is not suitable to be too low, otherwise the application efficiency of the coating will be negatively affected. Accordingly, the branched polyester constituting the reactive donor according to the present application has a viscosity of at least 500 mPa·s as measured by IWATA NK-2 at 25° C.

In some embodiments according to the present application, the reactive donor comprises at least one first branched polyester. The first branched polyester has a polyester backbone derived from an alcohol component comprising at least one alcohol having at least three hydroxyl functional groups and —C(O)—CH$_2$—C(O)-moiety covalently incorporated into the polyester backbone. The branched polyester has a novel specific structure in which at least one —C(O)—

CH$_2$—C(O)-moiety is covalently incorporated into the polymer backbone. That is, the —C(O)—CH$_2$—C(O)-moiety is mainly distributed in the middle of the backbone structure of the branched polyester, not at the terminal. The branched polyester of this structure was successfully synthesized by the applicant of the present application for the first time, and was successfully applied in the Michael addition-curable system. Prior to this application, there is no prior art to disclose and teach this new type of branched polyester and its use in a Michael addition-curable system. Thus, the novel branched polyester according to embodiments of the present application broadens the window of reactive donors for Michael addition-curable compositions, and thus extends the range of applications for Michael addition-curable compositions.

According to some embodiments of the present application, the first branched polyester has a weight average molecular weight of 30,000 g/mol or higher as determined by GPC referencing ASTM D5296. Preferably, the first branched polyester has a weight average molecular weight of 35,000 g/mol or higher, more preferably a weight average molecular weight of 40,000 g/mol or higher, still more preferably a weight average molecular weight of 45,000 g/mol or higher, even more preferably a weight average molecular weight of 50,000 g/mol or higher. Furthermore, the first branched polyester may have a molecular weight distribution of at least 10.0, preferably a molecular weight distribution of at least 12.0, more preferably a molecular weight distribution of at least 14.0, still more preferably a molecular weight distribution of 16.0, even more preferably a molecular weight distribution of 18.0, as determined by GPC referencing ASTM D5296.

According to some embodiments of the present application, the first branched polyester has a glass transition temperature of greater than 0° C., as determined by Differential Scanning calorimetry (DSC) using ASTM D6604-00. Preferably, the glass transition temperature of the first branched polyester is greater than 2° C. Considering the practical application, the glass transition temperature of the first branched polyester should not be too high, otherwise it will negatively affect the curing of the coating and bring about unnecessary VOC emissions. Therefore, the first branched polyester according to the present application preferably has a glass transition temperature in the range of 2° C. to 10° C. using ASTM D6604-00.

In one embodiment according to the present application, the first branched polyester is prepared by a transesterification reaction between an alcohol component and a carboxylic ester component in a one-step process, wherein the carboxylic ester component comprises at least one aromatic carboxylic ester having at least two carboxyl functional groups, and at least one alkyl malonate, and the alcohol component comprises at least one alcohol having at least three hydroxyl functional groups. As mentioned above, the first branched polyester is derived from alkyl malonate, so the first branched polyester is also referred to as a "malonate-type branched polyester".

The above-mentioned malonate-type branched polyester is prepared by a transesterification reaction between a carboxylic ester component and an alcohol component in a one-step process, wherein the carboxylic ester component is in excess relative to the alcohol component, so that gelling during the preparation of the branched polyesters can be avoided. For example, the carboxylic ester component to the alcohol component may have a molar equivalent ratio of 1.1:1 or higher, preferably 1.2:1 or higher, more preferably 1.3:1 or higher. Considering the practical application, the molar equivalent ratio of the carboxylic ester component to the alcohol component is at most 1.4:1.

As used herein, a carboxylic ester component is understood as a component capable of providing a potential carboxylic acid group. In the embodiment according, the carboxylic ester component comprises one or more C1-C6 alkyl malonates, such as dimethyl malonate, diethyl malonate, or a combination thereof, so that a —C(O)—CH$_2$—C(O)-moiety is introduced into the branched polyester.

In addition to the abovementioned alkyl malonates, the carboxylic ester component also comprises at least one aromatic alkyl carboxylate having at least two carboxyl functional groups, for example alkyl phthalate, alkyl isophthalate and alkyl terephthalate or combinations thereof. It was surprisingly found that in the process of preparing the malonate-type branched polyester by the above-mentioned one-step process, the aromatic alkyl carboxylate as a raw material can effectively control the progress of the reaction, and reduce or avoid products gelation, thereby obtaining the malonate-type branched polyester in one step. Therefore, in one particular embodiment of the present application, dimethyl phthalate, diethyl phthalate, diethyl terephthalate, dimethyl isophthalate, diethyl isophthalate, dimethyl terephthalate, or a combination thereof is used as one of the carboxylic ester component for synthesizing branched polyesters.

In one embodiment of the present application, the carboxylic ester component comprises, relative to the total weight of the carboxylic ester component, 40-65 wt % of an aromatic carboxylic ester having at least two carboxyl functional groups, preferably 45-60 wt % aromatic carboxylic ester having at least two carboxyl functional groups.

In one embodiment of the present application, the carboxylic ester component comprises, relative to the total weight of the carboxylic ester component, 35-60 wt % of alkyl malonate, preferably 40-55 wt % of alkyl malonate.

As used herein, an "alcohol component" is understood as a component capable of providing hydroxyl groups, including compounds, oligomers or polymers having at least one hydroxyl functional group. According to what is disclosed herein, the alcohol component comprises at least one alcohol having at least three hydroxyl functional groups (hereinafter simply referred to as triols), resulting in polyesters with a branched molecular backbone. In some embodiments of the present application, the alcohol component may further optionally include alcohols with at least four hydroxyl functional groups (hereinafter referred to as tetraols) or alcohols with more hydroxyl functional groups to further increase branching degree of the polyester. As examples of triols, tetraols and alcohols with more hydroxyl functional groups, trimethylolpropane, trimethylolethane, trimethylolhexane, glycerol, hexanetriol, pentaerythritol, mannitol, sorbitol, and combinations thereof may be given. Preferably, the alcohol component comprises, relative to the total weight of the alcohol component, 60-85 wt % of the triols, preferably 65-82 wt % of the triols, more preferably 70-80 wt % of the triols; and 0-10 wt % of the tetraols, preferably 0.1-10 wt % of the tetraols, more preferably 0.1-5 wt % of the tetraols.

In some embodiments according to the present application, the alcohol component may further comprise at least one alcohol having at least two hydroxyl functional groups (hereinafter simply referred to as diols) to adjust molecular flexibility of the branched polyester. As examples of diols, ethylene glycol, 1,2-propanediol, 1,3-propanediol, 1,2-butanediol, 1,3-butanediol, 1,4-butanediol, 2-ethyl-1,3-propanediol, 2-methylpropanediol, 2-butyl-2-ethylpropanediol, 2-ethyl-1,3-hexanediol, 1,3-neopentyl glycol, 2,2-dimethyl-1,3-pentanediol, 1,6-hexanediol, 1,2- and 1,4-cyclohexanediol, 1,2- and 1,4-bis(hydroxymethyl)cyclohexane, bis(4-hydroxycyclohexyl)methane, ether alcohols (e.g., diethylene glycol, triethylene glycol, or dipropylene glycol), or any combination thereof. Preferably, the alcohol component comprises, relative to the total weight of the alcohol component, 10-35 wt % of the diols, preferably 12-32 wt % of the diols, more preferably 15-30 wt % of the diols.

In one embodiment of the present application, the alcohol component comprises, relative to the total weight of the alcohol component, 10-35 wt % of the alcohol having at least two hydroxyl functional groups, 60-85 wt % of the alcohol the alcohol having at least three hydroxyl functional groups, and 0-10 wt % of the alcohol having at least four hydroxyl functional groups.

Suitable conditions for the reactions for the preparation of malonate-type branched polyesters depend on various factors, including the presence or absence of a catalyst, type of catalyst if present, reaction temperature, reaction time, etc., which can be determined empirically by those skilled in the art.

In other embodiments of the present application, the reactive donor comprises a second branched polyester. The second branched polyester has a polyester backbone derived from an alcohol component comprising at least one alcohol having at least three hydroxyl functional groups and a —C(O)—CH$_2$—C(O)-moiety covalently bonded to a terminal of the polyester backbone. This branched polyester has a different structure than the first branched polyester in that the —C(O)—CH$_2$—C(O)-moiety is distributed at terminals of the backbone structure of the branched polyester. Furthermore, this branched polyester may have a significantly lower —C(O)—CH$_2$—C(O)-moiety equivalent than the first branched polyester. In one embodiment of the present application, the second branched polyester may have a —C(O)—CH$_2$—C(O)-moiety equivalent of even 240 g/mol or less.

According to some embodiments of the present application, the second branched polyester has a weight average molecular weight of 4,000 g/mol to 10,000 g/mol, as determined by GPC referencing ASTM D5296. Preferably, the second branched polyester has a weight average molecular weight of 4,000 g/mol to 8,000 g/mol, more preferably a weight average molecular weight of 4,000 g/mol to 7,000 g/mol, still more preferably a weight average molecular weight of 4,500 g/mol to 6,000 g/mol, even more preferably a weight average molecular weight of 4,500 g/mol to 5,500 g/mol. Furthermore, the second branched polyester may have a molecular weight distribution of less than 3.5, preferably a molecular weight distribution of less than 3.4, more preferably, a molecular weight distribution in the range of 2.8 to 3.5, as determined by GPC referencing ASTM D5296.

According to some embodiments of the present application, the second branched polyester has a glass transition temperature of less than 0° C., as determined by Differential Scanning calorimetry (DSC) using ASTM D6604-00. Preferably, the glass transition temperature of the second branched polyester is less than −1° C. Considering the practical application, the glass transition temperature of the second branched polyester should not be too low, otherwise it will inevitably affect the hardness of the coating. Therefore, the second branched polyester according to the present application preferably has a glass transition temperature in the range of −5° C. to 0° C. using ASTM D6604-00.

In one embodiment according to the present application, the second branched polyester is obtained by the following steps: (i) reacting the alcohol component and a carboxylic acid component in an esterification reaction, thereby forming a polymer having a hydroxyl value of 200 mg KOH/g or higher and comprising at least one aromatic polyester backbone, wherein the carboxylic acid component comprises at least one aromatic carboxylic acid having at least two carboxyl groups, the alcohol component comprises at least one alcohol having at least three hydroxyl functional groups and wherein a molar equivalent ratio of the alcohol component to the carboxylic acid component is 1.2:1 or higher; and (ii) reacting the polymer and at least one alkyl acetoacetate in a transesterification reaction. As mentioned above, the second branched polyester is derived from an alkyl acetoacetate and is therefore also referred to as "acetoacetate-type branched polyester".

In the above step i), an esterification reaction occurs between the carboxylic acid component and the alcohol component. The alcohol component is in excess relative to the carboxylic acid component. Specifically, the molar equivalent ratio of the alcohol component to the carboxylic acid component is 1.2:1 or higher, more preferably 1.35:1 or higher, more preferably 1.4:1 or higher. In consideration of practical workability, the molar equivalent ratio of the alcohol component to the carboxylic acid component is at most 2.0:1 or less. A hydroxyl-functionalized polymer having an aromatic branched polyester backbone is thereby formed having a hydroxyl number of at least 200 mg KOH/mg resin, specifically at least 250 mg KOH/mg resin, more specifically at least 300 mg KOH/mg resin.

As mentioned above, a carboxylic acid component is understood as a component capable of providing carboxylic acid groups. In an embodiment, the carboxylic acid component comprises at least one aromatic carboxylic acid having at least two carboxyl functional groups. For example, phthalic acid, isophthalic acid, terephthalic acid, tetrachlorophthalic acid, tetrabromophthalic acid, anhydrides thereof, or any combination thereof may be used. In the embodiment, the aromatic carboxylic acid comprises phthalic anhydride. In addition to the above-mentioned aromatic carboxylic acid having at least two carboxyl functional groups, the carboxylic acid component optionally contains an aliphatic monobasic acid, the presence of which serves to adjust drying properties of the resulting resin composition. In one embodiment according to the present application, the aliphatic monobasic acid comprises one or more of caproic acid, caprylic acid, nonanoic acid, capric acid, lauric acid, myristic acid, palmitic acid and stearic acid, preferably lauric acid.

In one embodiment of the present application, the carboxylic acid component comprises, relative to the total weight of the carboxylic acid component, 50-100 wt % of an aromatic carboxylic acid having two or more carboxyl groups, preferably 60-80 wt % of an aromatic carboxylic acid having two or more carboxyl groups, more preferably 65-75 wt % of an aromatic carboxylic acid having two or more carboxyl groups; and 0-50 wt % of an aliphatic monocarboxylic acid, preferably 10-40 wt % of an aliphatic monocarboxylic acid, more preferably 20-35 wt % of an aliphatic monocarboxylic acid.

As mentioned above, an "alcohol component" is understood to mean a component capable of providing hydroxyl groups, including compounds, oligomers or polymers having one or more hydroxyl groups. In the embodiment according to the present application in which a second branched polyester is formed, the alcohol component comprises at least one alcohol having at least three hydroxyl functional groups to form a core point of the branched polyester. In order to provide a branched polyester with more branches, the alcohol component may further comprise at least one alcohol having at least four hydroxyl functional groups. In a preferred embodiment for forming the second branched polyester, the alcohol component comprises at least one alcohol having at least three hydroxyl functional groups (hereafter referred to simply as triols) and at least one alcohol having at least four hydroxyl functional groups (hereafter referred to simply as tetraols). As examples of triols and tetraols, trimethylolpropane, trimethylolethane, trimethylolhexane, glycerol, hexanetriol, pentaerythritol, and combinations thereof can be given. The alcohol component comprises, relative to the total weight of the alcohol component, 0-20 wt % of at least one alcohol having two hydroxyl functional groups, 40-100 wt % of at least one alcohol having three hydroxyl functional groups, and 0-60 wt % of at least one alcohol having at least four hydroxyl functional groups. Preferably, the alcohol component comprises, relative to the total weight of the alcohol component, 40-60 wt % of the triols, and 40-60 wt % of the tetraols.

Suitable conditions for the reaction carried out in step i) above depend on various factors including the presence or absence of a catalyst, type of catalyst if present, reaction temperature, reaction time, etc., which can be determined empirically by those skilled in the art.

The product thus obtained, i.e. the hydroxyl-functionalized polymer with an aromatic branched polyester backbone obtained in step i), can be used directly in step ii) of the present application.

In step ii), the polymer of step i) is functionalized with an alkyl acetoacetate to form a second branched polyester.

As a suitable example of alkyl acetoacetate, C1-C8 alkyl acetoacetate can be used. Preferably, the alkyl acetoacetate is selected from the group consisting of methyl acetoacetate, allyl acetoacetate, ethyl acetoacetate, tert-butyl acetoacetate, or a combination thereof, more preferably tert-butyl acetoacetate.

In an embodiment according to the present application for forming the second branched polyester, the alkyl acetoacetate is reacted with the hydroxyl-bearing polymer via a transesterification reaction, whereby the acetoacetyl functional group is attached as a terminal group to the molecular skeleton of polyester. Preferably, the molar equivalent ratio of hydroxyl groups in the hydroxyl-functionalized polymer to ester groups in the alkyl acetoacetate is from 1.001:1 to 1.2:1, more preferably from 1.005:1 to 1.15:1, still more preferably from 1.007:1 to 1.15:1, even more preferably from 1.007:1 to 1.10:1.

Suitable conditions for the reaction carried out in step ii) depend on various factors, including type of alkyl acetoacetate as used, the presence or absence of catalyst, type of catalyst if present, and the like, which can be determined empirically by those skilled in the art.

In yet other embodiments of the present application, the reactive donor comprises the first branched polyester described above and the second branched polyester described above, the first branched polyester and the second branched polyester have a molar ratio in the range of 0.1:1 to 5:1, preferably in the range of 0.5:1 to 3.05:1, more preferably in the range of 0.7:1 to 1.3:1.

In the Michael addition-curable compositions according to the present application, the amount of the first branched polyester as reactive donor can vary widely as desired. In some embodiments of the present application, the Michael addition-curable composition comprises, with respect to the total weight of the primary agent of the Michael addition-curable composition, 50 to 80% by weight of the first branched polyester as reactive donor, preferably 50 to 70% by weight of the first branched polyester as reactive donor, which primary agent is consisted of the remaining components excluding a catalyst and a diluent.

In the Michael addition-curable compositions according to the present application, the amount of the second branched polyester as reactive donor can vary widely as desired. In some embodiments of the present application, the Michael addition-curable composition comprises, with respect to the total weight of the primary agent of the Michael addition-curable composition, 50 to 85% by weight of the second branched polyester as reactive donor, preferably 50 to 70% by weight of the second branched polyester as reactive donor, which primary agent is consisted of the remaining components excluding a catalyst and a diluent.

In the Michael addition-curable compositions according to the present application, the total amount of the first and second branched polyester as reactive donor can vary widely as desired. In some embodiments of the present application, the Michael addition-curable composition comprises, with respect to the total weight of the primary agent of the Michael addition-curable composition, which primary agent is consisted of the remaining components excluding a catalyst and a diluent, 50 to 80% by weight of a combination of the first and second branched polyester as reactive donor, preferably 50 to 70% by weight of a combination of the first and second branched polyester as reactive donor.

Reactive Acceptor

According to an embodiment of the present application, the Michael Addition curable composition comprises a reactive acceptor containing a carbon-carbon double bond. Preferably, the reactive acceptor has two or more carbon-carbon double bonds, preferably two carbon-carbon double bonds. Generally, during the curing and crosslinking process of the coating, the higher the functionality of reactants, the higher the crosslinking density of the cured coating is, and the correspondingly higher the hardness of the coating is. It was surprisingly found that, compared to reactive acceptors containing more than two carbon-carbon double bond groups, such as reactive acceptors containing three carbon-carbon double bond groups or reactive acceptors containing four carbon-carbon double bond groups, reactive acceptors containing two carbon-carbon double bond groups are particularly advantageous for increasing the hardness of cured coatings in Michael addition-curable systems.

According to embodiments of the present application, the reactive receptors have a relatively low molecular weight and are generally present in non-polymeric form. Preferably, the reactive acceptors have a molar mass of 1000 g/mol or lower, preferably 500 g/mol or lower, more preferably 350 g/mol or lower.

According to an embodiment of the present application, the carbon-carbon double bond group contained in the reactive acceptor has a structure represented by the following formula I:

C=C—CX  (Formula I)

in which, CX represents any one of alkenyl group, alkynyl group, aldehyde group (—CHO), ketone group (—CO—), ester group (—C(O)O—) and cyano group (—CN). Preferably, the carbon-carbon double bond group is derived from one or more of α, β-unsaturated aldehyde, α, β-unsaturated ketone, α, β-unsaturated carboxylate ester and α, β-unsaturated nitrile, preferably from α, β-unsaturated carboxylate esters.

In one embodiment of the present application, the reactive acceptor may be selected from one or more of α, β-unsaturated carboxylate esters represented by the following formula:

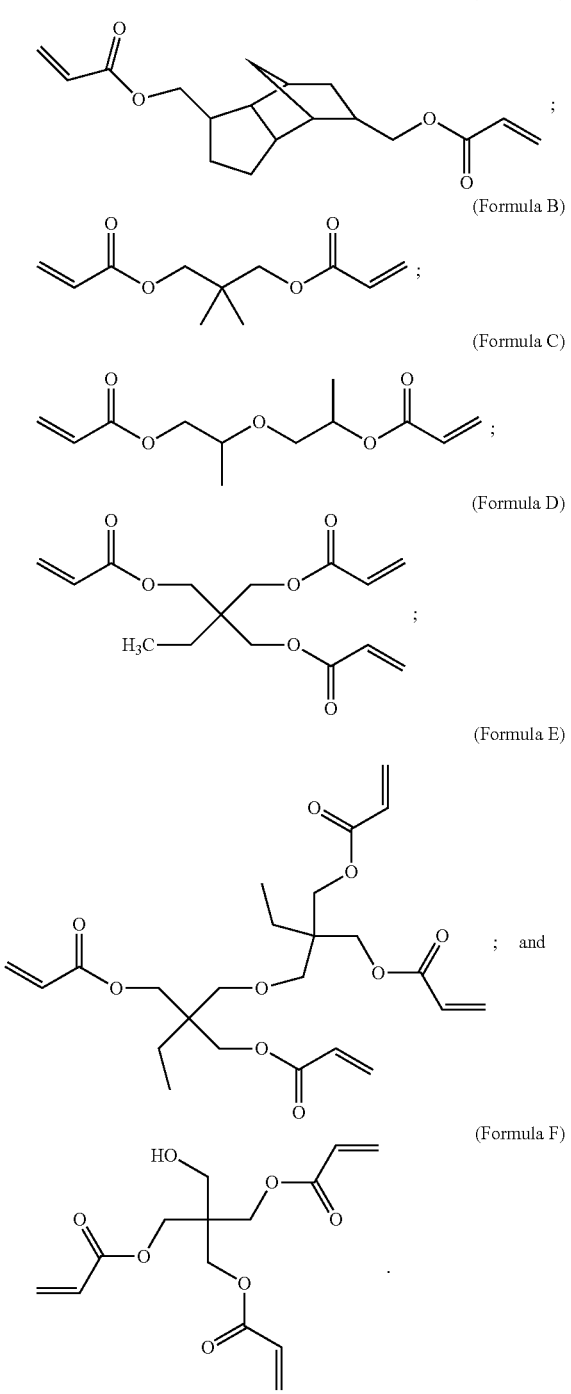

(Formula A)

(Formula B)

(Formula C)

(Formula D)

(Formula E)

; and (Formula F)

.

In a preferred embodiment of the present application, the reactive acceptor may be selected from one or more of the α, β-unsaturated carboxylate esters represented by Formula A, Formula C and Formula D.

In the Michael addition-curable compositions according to the present application, the amount of reactive acceptors as used can vary widely as desired. In some embodiments of the present application, the Michael addition-curable composition comprises, relative to the total weight of the primary agent of the Michael addition-curable composition, 20 to 45 wt % of reactive acceptors, preferably 20 to 40 wt % of reactive acceptors, which primary agent is consisted of the remaining components excluding the catalyst and the diluent.

Catalyst

In addition to the above components, the Michael Addition Curable composition according to the present application also comprises a catalyst for catalyzing the Michael Addition crosslinking reaction of the reactive acceptor and reactive donor.

In some embodiments of the present application, the catalyst is a latent base catalyst.

In an embodiment of the present application, the latent base catalyst described herein is a substituted carbonate salt having the structure of formula (II):

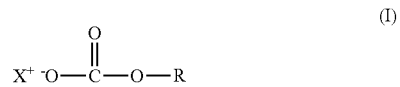

(I)

In Formula (II):

X$^+$ is a non-acidic cation. Suitable examples include, without limitation, alkali metal ion, alkali-earth metal ion, ammonium ion, phosphonium ion, and the like. Preferably, X$^+$ is a lithium, sodium, or potassium ion, and the like. More preferably, X$^+$ is a quaternary ammonium ion or a phosphonium ion;

R is H, optionally substituted C1-C10 alkyl, C6-C12 aryl, C7-C14 aralkyl or combinations thereof.

Preferably, R is an unsubstituted alkyl group having 1 to 4 carbon atoms. If the R group is substituted, the substituents are selected so as to not substantially interfere with the crosslinking reaction. In order to avoid interference with the action of the base catalyst, acidic substituents, such as for example, carboxylic acid substituents are present in only insubstantial amounts, or absent altogether.

In an embodiment, the latent base catalyst described herein is a compound with the general structure shown in Formula (II), wherein the cation X$^+$ is linked with the carbonate group of Formula (II) in a single molecule, i.e. the latent base catalyst has the general structure shown in Formula (II-1):

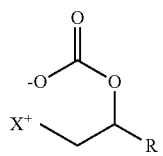

(Formula II-1)

in the formula (II-1), R and X$^+$ are defined as above.

In another embodiment, the latent base catalyst described herein is a compound of the general structure shown in Formula (II), wherein the group R is a polymer, and/or the cation X$^+$ is a quaternary ammonium ion or a phosphonium ion.

In a preferred embodiment, the latent base catalyst described herein is preferably a quaternary alkyl ammonium carbonate. Suitable examples include, without limitation, tetrahexylammonium methyl carbonate, tetradecyl-trihexylammonium-methyl carbonate, tetradecylammonium methyl carbonate, tetrabutylammonium methylcarbonate, tetrabutylammonium ethylcarbonate, benzyltrimethylammonium methyl carbonate, or trihexylmethylammonium methyl carbonate or trioctylmethylammonium methyl carbonate, and mixtures or combinations thereof.

Preferably, the latent base catalyst described herein include tetrabutylammonium alkylcarbonate. Latent catalysts of this type are known in the art. For example, a latent catalyst described herein may be a strong base which is blocked with di-ethyl carbonate.

Without limiting to theory, it is believed that the latent base catalyst of Formula (II) functions by releasing carbon dioxide when the carbonate salt decomposes. This produces a strong base, i.e. a hydroxide, an alkoxy, or an aralkyloxy base. In a closed pot, this reaction takes place slowly, allowing for extended pot life. When the coating is applied and surface area increases, the base is regenerated quickly as carbon dioxide escapes from the surface, allowing for faster cure (i.e. drying and hardness development) of the coating. Accordingly, the use of a latent base catalyst of Formula (II) allows for optimal potlife, open time, and cure performance for the crosslinkable coating compositions described herein.

In another embodiment, the catalyst may also include conventional catalysts (i.e., non-latent catalysts) known to those skilled in the art that are different from the above-mentioned latent base catalysts, which may be used alone or in combination with the latent base catalyst described herein to accelerate the Michael addition reaction.

Examples of suitable non-latent catalysts include, without limitation, tetrabutyl ammonium hydroxide (TBAH), ammonium hydroxide, DBU (8-Diazabicyclo[5.4.0]undec-7-ene), DBN (1,5-Diazabicyclo[4.3.0]non-5-ene), and TMG (1,1,3,3-tetramethylguanidine).

Suitable additional examples of non-latent catalysts include, without limitation, salts of cations including non-acidic cations such as K+, Na+, Li+, or weakly acidic cations such as, for example, protonated species of strong organic bases such as, for example, DBU, DBN, TMG or TBAH and the like, paired with a basic anion X⁻ from an acidic X—H group-containing compound, where X comprises N, P, O, S, C or Cl. Suitable examples of such non-latent catalyst may be tetrabutyl ammonium fluoride.

In one embodiment, the amount of catalyst used herein may vary depending on the nature of the composition. Preferably, the catalyst is present in an amount of 1.0 part by weight or more, preferably 1.4 parts by weight or more and not more than 10 parts by weight, preferably no more than 8 parts by weight and more preferably no more than 5 parts by weight, based on the solid amount of the catalyst relative to 100 parts by weight of the primary agent of the Michael Addition-curable composition that is consisted of other components than catalysts and diluents.

Other Components

The Michael Addition-curable composition according to an embodiment of the present application may further comprise at least one solvent in order to adjust viscosity of the composition to obtain the desired processability.

In certain embodiments of the present application, the solvent comprises one or more of alcohols, such as methanol, isopropanol, isobutanol, n-propanol, n-butanol, 2-butanol, pentanol, tert-amyl alcohol, neopentyl alcohol, n-hexanol, ethylene glycol, and the like; esters such as ethyl acetate, butyl acetate, methoxypropyl acetate, isobutyl acetate, propylene glycol methyl ether acetate and the like; ketones such as methyl ethyl ketone, methyl n-amyl ketone, and the like; ethers such as ethylene glycol butyl ether, and the like; aliphatic solvents such as solvent oils, and the like; and aromatic and/or alkylated aromatic solvents such as toluene, xylene, and the like.

In a specific embodiment of the present application, the solvent includes one or more of isopropanol, propylene glycol methyl ether acetate, ethyl acetate and butyl acetate.

In an embodiment of the present application, the weight percentage of solvents may vary within a wide range. Relative to 100 parts by weight of the primary agent in the Michael addition curable composition, the amount of solvent preferably varies in the range of 0.1 parts by weight to 35 parts by weight, more preferably 10 parts by weight to 30 parts by weight, still more preferably in the range of 15 parts by weight to 30 parts by weight, and even more preferably in the range of 20 parts by weight to 28 parts by weight.

In an embodiment of the present application, the composition of the present application may optionally further comprise other additional additives commonly used in the composition, which additives do not adversely affect the composition or cured product obtained therefrom. Suitable additives comprise, for example, those that improve processing or manufacturing properties of the composition, enhance aesthetics of the composition or cured product obtained therefrom, or improve specific functional properties or characteristics of the composition or cured product obtained therefrom (such as adhesion to the substrate). The additives that may be included are, for example, selected from adhesion promoters, curing accelerators, open time regulators, pigments and fillers, surfactants, lubricants, defoamers, dispersants, UV absorbers, colorants, coalescing agents, thixotropic agents, antioxidants, stabilizers, preservatives, and fungicides for providing the required performance as needed. The content of each optional ingredient is preferably sufficient to achieve its intended purpose, but does not adversely affect the composition or cured product obtained therefrom.

Michael Addition Curable Composition

According to embodiments of the present application, after components of the composition of the present application are mixed, the resulting mixture has a relatively long pot life and shows particularly excellent workability. In one embodiment of the present application, after components of the composition are mixed, the resulting mixture has a pot life of 6 hours or more, preferably of 7 hours or more, and more preferably of 8 hours or more, and even more preferably of 10 hours or more at 25° C.

The Michael Addition-curable composition of the present application can be cured at an appropriate temperature according to needs, for example, materials of coated substrate. In some embodiments, curing is performed at room temperature, especially within a range of 20-40° C. and preferably within a range of 25-35° C. In other embodiments, it can be cured under high temperature baking conditions, such as above 100° C.

The Michael Addition curable composition of the present application can be cured for an appropriate period of time, which depends on curing temperature. In some embodiments of the present application, the Michael Addition Curable composition of the present application may achieve tack-free in 2 hours or less, preferably in 1.8 hours or less, more preferably in 1.5 hours or less at room temperature. In other embodiments according to the present application, the Michael addition-curable composition of the present application has a gel time of 25 minutes or longer, preferably 30 minutes or longer, more preferably 35 minutes or more at room temperature.

The Michael Addition curable compositions according to the embodiments of the present application are suitable for a variety of applications, and can be used for manufacture of coatings, adhesives, sealants, foams, elastomers, films, molded articles, or inks.

Prior to use, the Michael Addition-curable composition according to embodiments of the present application may be stored in various ways. In certain embodiments according to the present application, components of the Michael Addition curable composition, such as a reactive donor, a reactive acceptor, and a catalyst, are stored separately. In other embodiments of the present application, certain components of the Michael Addition curable composition may be pre-mixed, for example, a reactive donor and a reactive acceptor may be pre-mixed, and a catalyst may be stored separately, or a catalyst may be pre-mixed with a reactive donor or a reactive acceptor, and the remaining component is stored separately. Upon using, a reactive donor, a reactive acceptor, a catalyst and other components are simply mixed in a mixing vessel at a predetermined weight ratio. The mixed curable composition can be shaped using various methods familiar to those skilled in the art, such as by molding, coating, extrusion, and the like. The composition thus obtained can be cured to form a desired cured product. Therefore, the present application also relates to a cured product obtained and/or obtainable by the Michael Addition curable composition of the present application.

Coating Composition

The Michael Addition curable composition according to the present application is particularly suitable for application of a coating composition in coating industry. Therefore, embodiments of the present application in still another aspect relates to a coating composition, comprising the Michael Addition curable composition according to the present application as a film-forming resin.

In certain embodiments, the coating compositions of the present application comprises:
- a primary agent comprising at least one reactive donor capable of providing two or more nucleophilic carbanions, at least one reactive acceptor containing two or more carbon-carbon double bond groups, and optionally additional additives such as thickeners, wetting agents, leveling agents, antifoaming agents, dispersing agents, pH adjusters, mildew inhibitors, preservatives, or any combination thereof;
- a catalyst comprising at least one catalyst for catalyzing the Michael addition crosslinking reaction of the reactive donor and the reactive acceptor; and
- solvents, comprising isopropanol, propylene glycol methyl ether acetate, ethyl acetate, butyl acetate, or combinations thereof.

In certain embodiments according to the present application, the coating composition is substantially free of a matting agent, preferably free of any matting agent. It was surprisingly found that the coating composition formulated with the above-mentioned Michael addition-curable compositions according to the present application comprising two branched polyesters of different structures as a reactive donor can achieve self-extinction without any additional matting agent, which was difficult to foresee prior to the present application.

In one embodiment of the present application, the reactive donor comprises a combination of a first branched polyester and a second branched polyester, the first branched polyester and the second branched polyester having a molar ratio in the range of 0.7:1 to 1.3:1, and the Michael addition-curable composition formulated therefrom can obtain a self-matting coating film without adding an additional matting agent.

In certain embodiments, paint films formed from the coating composition according to the present application have a gloss of not higher than 60 at 60 degree, preferably a gloss of not higher than 55 at 60 degree, more preferably a gloss of not higher than 50 at 60 degree, still more preferably a gloss of not higher than 45 at 60 degree, even more preferably a gloss of not higher than 40 at 60 degree and the most preferably a gloss in the range of 20-30 at 60 degree. The gloss is measured using a Sheen gloss meter.

It was further surprisingly found that in the formulation of the Michael addition-curable system according to the present application, the first branched polyester and the second branched polyester are in a specific molar ratio, for example in the range of 0.5:1 to 3.05:1, combined as a reactive donor, and the paint film formed by the prepared coating composition has a self-healing function. The self-healing function means that when the paint film is scratched by a hard object, a portion of scratches of the coating is capable of self-healing within 2 hours, preferably at least 50% of scratches is capable of self-healing within 2 hours, more preferably at least 70% of scratches is capable of self-healing within 2 hours.

In an embodiment in which the Michael Addition curable composition according to the present application is used as a coating composition, the composition can be applied in a variety of ways that are familiar to those skilled in the art, including spraying (e.g., air assisted, airless or electrostatic spraying), brushing, rolling, flooding and dipping. In an embodiment of the present application, the mixed coating composition is coated by spraying. The coating composition can be applied in various wet film thickness. In an embodiment of the present application, the coating composition is applied in such a wet film thickness in the range of about 100 to about 400 μm, preferably in the range of about 100 to 200 μm. The applied coating may be cured by air drying at room temperature or by accelerating drying with various drying devices e.g., ovens that are familiar to those skilled in the art.

Coated Articles

The present application in another aspect provided a coated article comprising a substrate having at least one major surface; and a cured coating formed from the coating composition of the present application that is directly or indirectly applied on the major surface.

According to what is disclosed herein, the substrate has at least one, preferably two, major surfaces that are opposite one another. As used herein, "major surface" is a surface defined by the lengthwise and widthwise dimensions of the substrate for providing decoration. Preferably, the major surface of substrate may contain polar groups such as hydroxyl groups, amino groups, mercapto groups, and the like for promoting adhesion. The hydroxyl group on the surface of substrate may be originated from the substrate itself, such as from cellulose when the substrate is a wooden substrate or may be introduced on the surface of substrate by performing surface treatment on the major surface of substrate, for example, by corona treatment.

According to the present application, the coating composition described herein may be applied on a variety of substrates. Suitable examples include, without limitation, natural and engineered buildings and building materials, freight containers, flooring materials, walls, furniture, other building materials, motor vehicles, motor vehicle components, aircraft components, trucks, rail cars and engines, bridges, water towers, cell phone tower, wind towers, radio towers, lighting fixtures, statues, billboard supports, fences, guard rails, tunnels, pipes, marine components, machinery components, laminates, equipment components, appliances, and packaging. Exemplary substrates include, without limitation, wood, metal, plastic, ceramic, cementitious board or any combination thereof.

The following examples describe the present application in more detail, which are for illustrative purposes only since various modifications and changes will be apparent to those skilled in the art from the scope of the present application. Unless otherwise indicated, all parts, percentages, and ratios reported in the following examples are on a weight basis and all reagents used in the examples are commercially available and may be used without further treatment.

EXAMPLES

Test Method

Gel time: At 25.5° C., a sample of the Michael addition-curable composition or coating composition was placed open in a glass bottle, and then measured with IWATA NK-2 to determine the time required for its viscosity to reach 2 times the initial viscosity.

Track-free time: At 25.5° C., a sample of the Michael addition-curable composition or coating composition was applied to the surface to be coated to form a 150 μm wet film, and then the time required for the resulting film to reach not to stick hands was measured according to GB1728-2020.

Hardness: At 25.5° C., after 150 μm wet film was applied and then dried for 7 days, the resulting film was measured according to standard ASTM D3363 for its hardness.

Adhesion: At 25.5° C., after 150 μm wet film was applied and then dried for 7 days, the resulting film was measured according to standard ASTM D3359 for its adhesion.

Gloss: At 25.5° C., after 150 μm wet film was applied and then dried for 7 days, the resulting film was measured using a Sheen pinhole glossmeter according to ASTM D523 for its 60° gloss.

Self-healing performance: At 25.5° C., after 150 μm wet film was applied and then dried for 7 days, the resulting cured coating was scratched with a sharpened HB pencil, and then observed with the naked eye for its scratch recovery within 2 hours.

Reactive Donor

Malonate-type branched polyester (a first branched polyester) A1: A four-necked flask equipped with a thermometer, overhead stirrer, gas inlet, and distillation apparatus was charged with 59 g of neopentyl glycol, 162 g of trimethylolpropane, 2 g of pentaerythritol, 350 g of diethyl phthalate, 279 g of diethyl malonate, and 0.7 g of n-butyltin hydroxide, and the resulting mixture was heated to 150° C. under nitrogen. At 150° C., ethanol began to distill out. The reaction temperature was increased to 235° C. and maintained at this temperature until ethanol ceased to come out. All residual ethanol was collected by cooling to 170° C. and holding the mixture under vacuum. The obtained reactive donor A1 had the following properties: a weight average molecular weight of 57974 g/mol as measured by GPC referencing ASTM D5296, a molecular weight distribution of 19.0, a Tg of 2.4° C., a viscosity of less than 1000 mPa·s@25° C., —C(O)—$CH_2$—C(O)-moiety equivalent of 370 g/mol.

Acetoacetate-type branched polyester (a second branched polyester) A2: was prepared in the following manner. At room temperature, a four-necked flask equipped with a thermometer, overhead stirrer, gas inlet and distillation device was charged with 209 g of trimethylolpropane, 212 g of pentaerythritol, 178 g of lauric acid and 349 g of phthalic anhydride. $N_2$ gas was supplied through the gas inlet for providing $N_2$ protection. Then, the resulting reaction mixture was slowly heated to about 180° C., collected water and maintained at this temperature until the distillation temperature did not exceed 100° C. Under this distillation temperature <=100° C., the temperature of mixture was raised to 235° C. When the temperature of mixture reached 235° C., it was kept for a while until the acid value was below 5 mg KOH/g. The mixture was then cooled to below 150° C. After 833 g of tert-butyl acetoacetate (t-BAA) was charged, the resulting reaction mixture was heated to 120° C., collected distillate (tert-butanol) and maintained at this temperature until the distillation temperature did not exceed 78° C. Under this distillation temperature <=78° C., the temperature of mixture was raised to 180° C. When the temperature of mixture reached 180° C., it was kept for a while until the distillation temperature was below 60° C. The mixture was then cooled to below 100° C. and then mixed with 488 g of n-butyl acetate (n-BA) with a solids content of about 68%. The obtained reactive donor A2 had the following properties: a weight average molecular weight of 5227 g/mol as measured by GPC referencing ASTM D5296, a molecular weight distribution of 3.2, a Tg of −1.2° C., a viscosity of less than 1000 mPa·s@25° C., —C(O)—$CH_2$—C(The O)-moiety equivalent of 228 g/mol.

Reactive Acceptor

TABLE 1

| various reactive acceptors | |
|---|---|
| Reactive Acceptors | Structure Formula |
| B1 | DPGDA Dipropylene glycol diacrylate |

TABLE 1-continued various reactive acceptors

| Reactive Acceptors | Structure Formula |
|---|---|
| B2 | 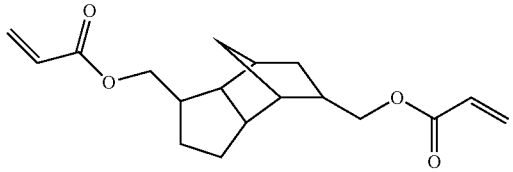 [SMILES: C=CC(=O)OCC1CC2CC1C1CCC(COC(=O)C=C)C21] |
| B3 | 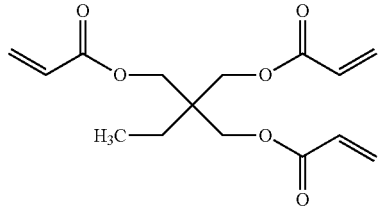 [SMILES: C=CC(=O)OCC(CC)(COC(=O)C=C)COC(=O)C=C] |
| B4 | 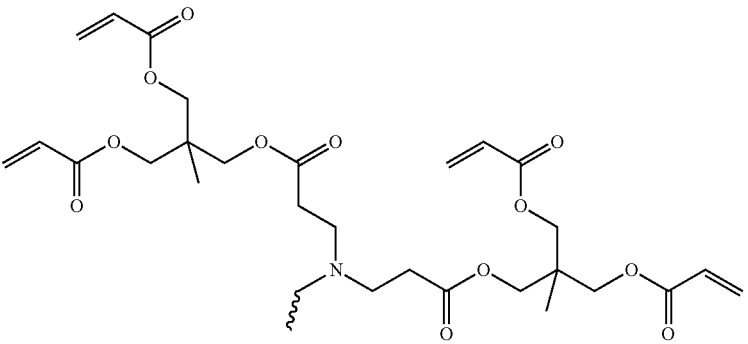 |

Catalyst

Catalysts C1: Strong base which is blocked with di-ethyl carbonate

Catalysts C1: 30% aqueous solution of tetrabutylammonium fluoride

Coating Composition

Example 1 Michael Addition Curable Composition

The ingredients of Component A in the amounts shown in Table 2 and Table 3 below were mixed to form Component A, and then Component A, Component B and Component C were mixed in the amounts shown in Table 2 below, thereby forming coating compositions 1-16 suitable for forming Michael addition cured coatings.

The compositions prepared in the examples shown in the following Tables 2 and 3 were respectively applied to the test substrate with a wet coating thickness of 100 microns, and cured at room temperature. The time required for curing was recorded in Tables 2 and 3. middle. The indicator of "curing" here is that the coating reaches not to stick hands, which can also be called "track-free time". After 3 days, the curing was tested for its pencil hardness.

TABLE 2

Components of compositions 1-1 to 1-8 and the resulting coating performances

|  |  | Composition 1-1 | Composition 1-2 | Composition 1-3 | Composition 1-4 | Composition 1-5 | Composition 1-6 | Composition 1-7 | Composition 1-8 |
|---|---|---|---|---|---|---|---|---|---|
| Component A |  |  |  |  |  |  |  |  |  |
| Reactive donor | A1/g | / | / | / | / | 64 | 64 | 60 | 59 |
|  | A2/g | 53 | 53 | 48 | 59 | / | / | / | / |
| Reactive acceptor | B1/g | 38 | / | / | / | 28 | / | / | / |
|  | B2/g | / | / | 43 | / | / | / | 33 | / |
|  | B3/g | / | / | / | 34 | / | / | / | 32 |
|  | B4/g | / | 40 | / | / | / | 30 | / | / |

TABLE 2-continued

Components of compositions 1-1 to 1-8 and the resulting coating performances

|  | Composition 1-1 | Composition 1-2 | Composition 1-3 | Composition 1-4 | Composition 1-5 | Composition 1-6 | Composition 1-7 | Composition 1-8 |
|---|---|---|---|---|---|---|---|---|
| Butyl acetate/g Component B | 9 | 7 | 9 | 7 | 8 | 6 | 7 | 9 |
| Catalyst C1/g Component C | 3.6 | 3.6 | 3.6 | 3.6 | 3.6 | 3.6 | 3.6 | 3.6 |
| n-butyl acrylate | 20 | 20 | 20 | 20 | 20 | 20 | 20 | 20 |
| Track-free time/min | 61 | 55 | 63 | 55 | 15 | 10 | 11 | 10 |
| Hardness @ 3 days | 117 | 105 | 127 | 130 | 69 | 57 | 71 | 51 |

TABLE 3

Components of compositions 1-9 to 1-16 and the resulting coatings performances

| | | Composition 1-9 | Composition 1-10 | Composition 1-11 | Composition 1-12 | Composition 1-13 | Composition 1-14 | Composition 1-15 | Composition 1-16 |
|---|---|---|---|---|---|---|---|---|---|
| Component A | | | | | | | | | |
| Reactive donor | A1/g | / | / | / | / | 64 | 64 | 60 | 59 |
| | A2/g | 53 | 53 | 48 | 59 | / | / | / | / |
| Reactive acceptor | B1/g | 38 | / | / | / | 28 | / | / | / |
| | B2/g | / | / | 43 | / | / | / | 33 | / |
| | B3/g | / | / | / | 34 | / | / | / | 32 |
| | B4/g | / | 40 | / | / | / | 30 | / | / |
| Butyl acetate/g Component B | | 9 | 7 | 9 | 7 | 8 | 6 | 7 | 9 |
| Catalyst C2/g Component C | | 3.6 | 3.6 | 3.6 | 3.6 | 3.6 | 3.6 | 3.6 | 3.6 |
| n-butyl acrylate | | 20 | 20 | 20 | 20 | 20 | 20 | 20 | 20 |
| Track-free time/min | | 210 | 160 | 180 | 150 | >600 | >600 | >600 | >600 |
| Hardness @ 3 days | | 123 | 102 | 119 | 114 | Track | Track | Track | Track |

It was shown in the results of Table 2 and Table 3 that the branched polyester according to the present application can be combined with various reactive acceptors and different catalysts to form a Michael addition-curable system, and the resulting Michael addition-curable composition can be cured at room temperature. According to the specific experimental results, it can be seen that the type of branched polyester and the choice of catalyst have influence on the track-free time and hardness of the curing system. The combination of acetoacetate-type branched polyester and catalyst of a strong base which is blocked with di-ethyl carbonate (Examples 1-4) had a shorter tack-free time (about 1 hour), and established a proper hardness within 3 days. Furthermore, the malonate-type branched polyester A1, which was successfully synthesized by the applicant of the present application for the first time using a one-step process, is also suitable for formulating a Michael addition curable compositions with certain catalysts, such as a catalyst with a strong base which is blocked with di-ethyl carbonate, and the resulting coating likewise exhibit a proper cure speed and 3 days hardness.

Example 2: Effect of Reactive Donors Combination on Properties of Coating Compositions The ingredients of Component A in the amounts shown in Table 4 below were mixed to form Component A, and then Component A, Component B, and Component C were mixed in the amounts shown in Table 4 below to form Michael Addition-curable coating compositions 2-1 to 2-10. The resulting coating composition was applied by drawdown into 150 μm wet film for test.

TABLE 4

Effect of Reactive Donor combination on Properties of Coating Compositions

|  |  | Composition 2-1 | Composition 2-2 | Composition 2-3 | Composition 2-4 | Composition 2-5 | Composition 2-6 | Composition 2-7 | Composition 2-8 | Composition 2-9 | Composition 2-10 |
|---|---|---|---|---|---|---|---|---|---|---|---|
| Component A | | | | | | | | | | | |
| Reactive donor | A1/g | 10 | 12 | 15 | 20 | 31 | 36 | 42 | 48 | 52 | 55 |
| | A2/g | 50 | 48 | 45 | 40 | 31 | 27 | 21 | 16 | 13 | 11 |
| | Molar ratio A1:A2 | 0.12/1 | 0.15/1 | 0.2/1 | 0.31/1 | 0.61/1 | 0.81/1 | 1.22/1 | 1.83/1 | 2.44/1 | 3.05/1 |
| Reactive Acceptor | B1/g | 39 | 39 | 39 | 37 | 36 | 35 | 33 | 32 | 32 | 32 |
| Butyl acetate/g | | 1 | 1 | 1 | 3 | 2 | 2 | 4 | 4 | 3 | 2 |
| Component B | | | | | | | | | | | |
| strongbase blocked with di-ethyl carbonate Component C | | 3.6 | 3.6 | 3.6 | 3.6 | 3.6 | 3.6 | 3.6 | 3.6 | 3.6 | 3.6 |
| n-butyl acetate | | 10 | 10 | 10 | 10 | 10 | 10 | 10 | 10 | 10 | 10 |
| Properties | | | | | | | | | | | |
| Gel time/min | | 26 | 27 | 27 | 28 | 35 | 38 | 42 | 42 | 42 | 45-50 |
| Track-free time/min | | 22 | 25 | 25 | 25-30 | 25-30 | 25-30 | 27 | 27 | 25 | 25 |
| gloss | | 94 | 93 | 93 | 92 | 82 | 45 | 52 | 94 | 93 | 93 |
| Adhesion | | 5B | 5B | 5B | 5B | 5B | 5B | 5B | 5B | 5B | 5B |
| Hardness | | HB | HB | HB | HB | H | H | 3H | 1-2H | 2H | H |
| Self-healing percentage (1 h) | | 0 | 0 | 0 | 0 | 100 | 100 | 100 | 100 | 100 | 100 |

From the results in Table 4 above, it can be seen that the two branched polyesters with different structures according to the present application have good compatibility, and their combination can be used as reactive donors for formulating a Michael addition-curable composition. The compositions thus formulated show good curing properties, and the coating films formed therefrom have good coating properties. In addition, it was surprising that the above-mentioned two branched polyesters of different structures are combined in a specific mass ratio, and the resulting coating composition can obtain a low-gloss coating film without adding an additional matting agent and even can achieve self-extinction, which was difficult to foresee prior to this application.

Example 3: Gel Time of Coating Compositions

In this example, the gel time of primers and topcoats formed from the Michael curable compositions of the present application under different application solids content and different temperature conditions was investigated. The Michael Addition Curable Primer 3-1 and Topcoat 3-2 were formulated according to the composition ingredients shown in Table 5 in which compositions with different application solids content was formed by adding a different amount of solvent. The test data of gel time under different construction solids and different temperatures were shown in Table 5.

TABLE 5

Gel Time of Primer and Topcoat

| | Michael Addition Curable Primer 3-1 | Michael Addition Curable Topcoat 3-2 |
|---|---|---|
| Formulation | | |
| Primary paint | A2 56 wt % | A1 36 wt % |
| | B4 13 wt % | A2 27 wt % |
| | B1 28 wt % | B1 35 wt % |
| | Defoamer 0.4 wt % | defoamer 0.4 wt % |
| | N-butyl acetate 2.6 wt % | N-butyl acetate 1.6 wt % |
| Catalyst | strong base blocked with di-ethyl carbonate | strong base blocked with di-ethyl carbonate |

| Gel time (min) | | | | | | | | | | |
|---|---|---|---|---|---|---|---|---|---|---|
| Application solids content | 10° C. | 20.8° C. | 25° C. | 30° C. | 35° C. | 10° C. | 20.8° C. | 25° C. | 30° C. | 35° C. |
| 30% | | >90 | >120 | 90 | 50 | | >120 | >90 | >120 | >90 |
| 40% | | 90 | 90 | 50 | 37 | | >120 | >90 | >120 | >90 |
| 50% | | 60 | 50 | 30 | 23 | | >120 | >90 | >120 | 90 |
| 60% | 80 | 30 | 30 | 18 | 15 | >180 | 120 | >90 | 100 | 45 |
| 70% | | | 20 | 12 | | | | | | 35 |

It can be seen from the experimental results in Table 5 that the higher the reaction temperature and the higher the construction solids content, the shorter the gel time is. A higher gel time can be achieved at a lower temperature and a lower application solids content.

Example 4: Gloss of Topcoat

To further investigate properties of the coating compositions of the present application and the resulting coatings, the coating compositions 2-6 above as a topcoat was combined with two different primer, and the gloss of the resulting coating systems was determined. The performance results were summarized in Table 6 below.

TABLE 6

Coating systems and their gloss levels

| Composition | Primer | Topcoat | Gloss/60° |
|---|---|---|---|
| Coating system 1 | Michael Addition Curable Composition 2-6 | Primer 3-1 | 45-55 |
| Coating system 2 | Michael Addition Curable Composition 2-6 | Primer 3-1 + 5 wt % ceramics micro-beads | 20-30 |

From the results in Table 6 above, it can be seen that the coating composition according to the present application can be matched with various primers, and even may achieve a lower gloss coating systems when matched with a primer comprising an amount of powder.

EMBODIMENTS

Embodiment 1: A Michael Addition curable composition, comprising: at least one reactive donor capable of providing two or more nucleophilic carbanions; at least one reactive acceptor comprising two or more carbon-carbon double bonds; and at least one catalyst for catalyzing a Michael Addition crosslinking reaction between the at least one reactive donor and the at least one reactive acceptor, wherein the at least one reactive donor comprises at least one branched polyester comprising at least one polyester backbone and at least one —C(O)—CH$_2$—C(O)-moiety; wherein the at least one polyester backbone is derived from an alcohol component comprising at least one alcohol having at least three hydroxyl groups; and wherein the at least one branched polyester has a —C(O)—CH$_2$—C(O)-moiety equivalent of no more than 700 g/mol.

Embodiment 2: An embodiment of Embodiment 1, wherein the at least one branched polyester has a —C(O)—CH$_2$—C(O)-moiety equivalent in a range of 200-600 g/mol, preferably in a range of 200-500 g/mol, more preferably in a range of 200-400 g/mol and even more preferably in a range of 200-240 g/mol.

Embodiment 3: An embodiment of any of Embodiments 1-2, wherein the at least one branched polyester comprises at least one aromatic polyester backbone.

Embodiment 4: An embodiment of any of Embodiments 1-3, wherein the at least one branched polyester has a viscosity of less than 2000 mPa·s, as measured by IWATA NK-2 at 25° C.

Embodiment 5: An embodiment of any of Embodiments 1-4, wherein the at least one reactive donor comprises at least one first branched polyester, at least one second branched polyester, or combinations thereof, wherein the at least one first branched polyester comprises at least one polyester backbone derived from an alcohol component comprising at least one alcohol having at least three hydroxyl groups, and at least one —C(O)—CH$_2$—C(O)-moiety covalently incorporated into the polyester backbone; and wherein the at least one second branched polyester comprises at least one polyester backbone derived from an alcohol component comprising at least one alcohol having at least three hydroxyl groups and at least one —C(O)—CH$_2$—C(O)-moiety covalently bonded to a terminal of the polyester backbone.

Embodiment 6: An embodiment of Embodiment 5, wherein the at least one reactive donor comprises the at least one first branched polyester and the at least one second branched polyester having a molar ratio in a range of from 0.1:1 to 5:1, preferably in a range of from 0.5:1 to 3.05:1, more preferably in a range of from 0.7:1 to 1.3:1.

Embodiment 7: An embodiment of Embodiment 5, wherein the at least one first branched polyester has a weight average molecular weight of 30,000 g/mol or higher, which is measured by GPC referencing ASTM D5296.

Embodiment 8: An embodiment of Embodiment 5, wherein the at least one first branched polyester has a glass transition temperature of greater than 0° C., which is measured by Differential Scanning calorimetry (DSC) using ASTM D6604-00.

Embodiment 9: An embodiment of Embodiment 5, wherein the at least one first branched polyester is prepared by a transesterification reaction between the alcohol component and a carboxylic ester component, wherein the alcohol component and the carboxylic ester component has a molar equivalent ratio of 1:1.1 or lower; and wherein the carboxylic ester component comprises at least one aromatic carboxylic ester having at least two carboxyl groups, and at least one alkyl malonate.

Embodiment 10: An embodiment of Embodiment 9, wherein the at least one aromatic carboxylic ester comprises alkyl phthalates, alkyl isophthalates, alkyl paraphthalates or combination thereof.

Embodiment 11: An embodiment of any of Embodiments 9-10, wherein based on the total weight of the carboxylic ester component, the carboxylic ester component comprises: 40-65 wt % of the at least one aromatic carboxylic ester having at least two carboxyl groups; and 35-60 wt % of the at least one alkyl malonates.

Embodiment 12: An embodiment of Embodiment 9, wherein the alcohol component comprises at least one alcohol having two hydroxyl groups, at least one alcohol having three hydroxyl groups and optional at least one alcohol having at least four hydroxyl groups.

Embodiment 13: An embodiment of Embodiment 12, wherein the alcohol component comprises, relative to the total weight of the alcohol component, 10-35 wt % of the at least one alcohol having two hydroxyl groups; 60-85 wt % of the at least one alcohol having three hydroxyl groups, and 0-10 wt % of the at least one alcohol having at least four hydroxyl groups.

Embodiment 14: An embodiment of any of Embodiments 9-13, wherein the at least one alkyl malonate comprises at least one C1-C6 alkyl malonates.

Embodiment 15: An embodiment of any of Embodiments 5-14, wherein the at least one second branched polyester has a weight average molecular weight in the range of from 4000 to 10000 g/mol, which is measured by GPC referencing ASTM D5296.

Embodiment 16: An embodiment of any of Embodiments 5-15, wherein the at least one second branched polyester has a glass transition temperature of less than 0° C., which is measured by Differential Scanning calorimetry (DSC) using ASTM D6604-00.

Embodiment 17: An embodiment of any of Embodiments 5-16, wherein the at least one second branched polyester is prepared by the following steps: (i) reacting the alcohol component and a carboxylic acid component in an esterification reaction, thereby forming a polymer having a hydroxyl value of 200 mg KOH/g or higher and comprising at least one aromatic polyester backbone, wherein the carboxylic acid component comprises at least one aromatic carboxylic acid having at least two carboxyl groups, and wherein a molar equivalent ratio of the alcohol component to the carboxylic acid component is 1.2:1 or higher; and (ii) reacting the polymer and at least one alkyl acetoacetate in a transesterification reaction.

Embodiment 18: An embodiment of Embodiment 17, wherein the carboxylic acid component comprises, relative to the total weight of the carboxylic acid component, 50-100 wt % of the at least one aromatic carboxylic acid having at least two carboxyl groups; and 0-50 wt % of at least one aliphatic monocarboxylic acid.

Embodiment 19: An embodiment of any of Embodiments 17-18, wherein the alcohol component comprises, relative to the total weight of the alcohol component, 0-20 wt % of the at least one alcohol having two hydroxyl groups; 40-100 wt % of the at least one alcohol having three hydroxyl groups, and 0-60 wt % of the at least one alcohol having at least four hydroxyl groups.

Embodiment 20: An embodiment of any of Embodiments 17-19, wherein the at least one alkyl acetoacetate comprises at least one C1-C8 alkyl acetoacetates.

Embodiment 21: An embodiment of any of Embodiments 1-20, wherein the at least one reactive acceptor comprises a carbon-carbon double bond having the structure of Formula I below:

(Formula I)

wherein CX represents any one of an aldehyde group (—CHO), a keto group (—CO—), an ester group (—C(O)O—), and a cyano group (—CN).

Embodiment 22: An embodiment of any of Embodiments 1-21, further comprising at least one solvent, wherein the at least one solvent comprises isopropanol, propylene glycol methyl acetate, ethyl acetate and butyl acetate or combination thereof.

Embodiment 23: An embodiment of any of Embodiments 1 to 22 used to manufacture coatings, adhesives, sealing agents, foaming materials, films, molded products or inks.

Embodiment 24: A coating composition, comprising the Michael Addition curable composition according to any of claims 1 to 22 as a film-forming resin.

Embodiment 25: An embodiment of Embodiment 24, wherein the coating composition is substantially free of matting agent.

Embodiment 26: An embodiment of any of Embodiments 24-25, a cured coating formed from which has a gloss of no higher than 60 at 60°, preferably no higher than 55 at 60°, more preferably no higher than 50 at 60°, even more preferably no higher than 45 at 60°, still even more preferably no higher than 40 at 60°, and the most preferably in the range of 20-30 at 60°, as measured with a Sheen gloss meter.

Embodiment 27: An embodiment of any of Embodiments 24-26, a portion of a cured coating formed which is capable of self-healing within 2 hours.

Embodiment 28: A coated article comprising a substrate having at least one major surface; and a cured coating formed from the coating composition according to any of claims 24-27 that is at least partially directly or indirectly applied on the major surface.

Embodiment 29: An embodiment of Embodiment 28, wherein the substrate comprises wood, metal, plastic, ceramic, cementitious board, or combination thereof.

While what is disclosed herein has been described with respect to a number of embodiments and examples, those skilled in the art, having benefit of what is disclosed, will appreciate that other embodiments can be devised which do not depart from the scope and spirit of what is disclosed herein.

What is claimed is:

1. A Michael Addition curable composition, comprising:
at least one reactive donor capable of providing two or more nucleophilic carbanions;
at least one reactive acceptor comprising two or more carbon-carbon double bonds; and
at least one catalyst for catalyzing a Michael Addition crosslinking reaction between the at least one reactive donor and the at least one reactive acceptor,
wherein the at least one reactive donor comprises at least one branched polyester comprising at least one polyester backbone and at least one —C(O)—CH$_2$—C(O)-moiety;
wherein the at least one polyester backbone is derived from an alcohol component comprising at least one alcohol having at least three hydroxyl groups; and
wherein the at least one branched polyester has a —C(O)—CH$_2$—C(O)-moiety equivalent in a range of 200-600 g/mol; and
wherein in the event that the at least one branched polyester comprises at least one polyester backbone derived from an alcohol component comprising at least one alcohol having at least three hydroxyl groups, and at least one —C(O)—CH$_2$—C(O)-moiety covalently incorporated into the polyester backbone, the catalyst is a latent base catalyst.

2. The Michael Addition curable composition according to claim 1, wherein the at least one branched polyester has a viscosity of less than 2000 mPa·s, as measured by IWATA NK-2 at 25° C.

3. The Michael Addition curable composition according to claim 1, wherein the at least one reactive donor comprises at least one first branched polyester, at least one second branched polyester, or combinations thereof,
wherein the at least one first branched polyester comprises at least one polyester backbone derived from an alcohol component comprising at least one alcohol having at least three hydroxyl groups, and at least one —C(O)—CH$_2$—C(O)-moiety covalently incorporated into the polyester backbone; and
wherein the at least one second branched polyester comprises at least one polyester backbone derived from an alcohol component comprising at least one alcohol having at least three hydroxyl groups and at least one —C(O)—CH$_2$—C(O)-moiety covalently bonded to a terminal of the polyester backbone.

4. The Michael Addition curable composition according to claim 3, wherein the at least one reactive donor comprises the at least one first branched polyester and the at least one second branched polyester having a molar ratio in a range of from 0.1:1 to 5:1.

5. The Michael Addition curable composition according to claim 3, wherein the at least one first branched polyester has a weight average molecular weight of 30,000 g/mol or higher, which is measured by GPC referencing ASTM D5296.

6. The Michael Addition curable composition according to claim 3, wherein the at least one first branched polyester has a glass transition temperature of greater than 0° C., which is measured by Differential Scanning Calorimetry (DSC) using ASTM D6604-00.

7. The Michael Addition curable composition according to claim 3, wherein the at least one first branched polyester is prepared by a transesterification reaction between the alcohol component and a carboxylic ester component,
wherein the alcohol component and the carboxylic ester component has a molar equivalent ratio of 1:1.1 or lower; and
wherein the carboxylic ester component comprises at least one aromatic carboxylic ester having at least two carboxyl groups, and at least one alkyl malonate.

8. The Michael Addition curable composition according to claim 7, wherein the at least one aromatic carboxylic ester comprises alkyl phthalates, alkyl isophthalates, alkyl paraphthalates or combination thereof.

9. The Michael Addition curable composition according to claim 7, wherein based on the total weight of the carboxylic ester component, the carboxylic ester component comprises:
40-65 wt % of the at least one aromatic carboxylic ester having at least two carboxyl groups; and
35-60 wt % of the at least one alkyl malonates.

10. The Michael Addition curable composition according to claim 7, wherein the alcohol component comprises at least one alcohol having two hydroxyl groups, at least one alcohol having three hydroxyl groups, and at least one alcohol having at least four hydroxyl groups.

11. The Michael Addition curable composition according to claim 10, wherein the alcohol component comprises, relative to the total weight of the alcohol component,
10-35 wt % of the at least one alcohol having two hydroxyl groups;
60-85 wt % of the at least one alcohol having three hydroxyl groups, and
0-10 wt % of the at least one alcohol having at least four hydroxyl groups.

12. The Michael Addition curable composition according to claim 7, wherein the at least one alkyl malonate comprises at least one C1-C6 alkyl malonates.

13. The Michael Addition curable composition according to claim 3, wherein the at least one second branched polyester has a weight average molecular weight in the range of from 4000 to 10000 g/mol, which is measured by GPC referencing ASTM D5296.

14. The Michael Addition curable composition according to claim 3, wherein the at least one second branched polyester has a glass transition temperature of less than 0° C., which is measured by Differential Scanning Calorimetry (DSC) using ASTM D6604-00.

15. The Michael addition curable composition of claim 3, wherein the at least one second branched polyester is prepared by the following steps:

(i) reacting the alcohol component and a carboxylic acid component in an esterification reaction, thereby forming a polymer having a hydroxyl value of 200 mg KOH/g or higher and comprising at least one aromatic polyester backbone, wherein the carboxylic acid component comprises at least one aromatic carboxylic acid having at least two carboxyl groups, and wherein a molar equivalent ratio of the alcohol component to the carboxylic acid component is 1.2:1 or higher; and (ii) reacting the polymer and at least one alkyl acetoacetate in a transesterification reaction.

16. The Michael Addition curable composition according to claim 15, wherein the carboxylic acid component comprises, relative to the total weight of the carboxylic acid component,
50-100 wt % of the at least one aromatic carboxylic acid having at least two carboxyl groups; and
0-50 wt % of at least one aliphatic monocarboxylic acid.

17. The Michael Addition curable composition according to claim 15, wherein the alcohol component comprises, relative to the total weight of the alcohol component,
0-20 wt % of the at least one alcohol having two hydroxyl groups;
40-100 wt % of the at least one alcohol having three hydroxyl groups, and
0-60 wt % of the at least one alcohol having at least four hydroxyl groups.

18. The Michael addition curable composition according to claim 15, wherein the at least one alkyl acetoacetate comprises at least one C1-C8 alkyl acetoacetates.

19. The Michael Addition curable composition according to claim 1, wherein the at least one reactive acceptor comprises a carbon-carbon double bond having the structure of Formula I below:

   (Formula I)

wherein CX represents any one of an aldehyde group (—CHO), a keto group (—CO—), an ester group (—C(O)O—), and a cyano group (—CN).

20. The Michael Addition curable composition according to claim 1, further comprising at least one solvent, wherein the at least one solvent comprises isopropanol, propylene glycol methyl acetate, ethyl acetate and butyl acetate or combination thereof.

21. A coating composition, comprising the Michael Addition curable composition according to claim 1 as a film-forming resin.

22. The coating composition according to claim 21, wherein the coating composition is substantially free of matting agent.

23. The coating composition according to claim 21, a cured coating formed from which has a gloss of no higher than 60 at 60° as measured with a Sheen gloss meter.

24. The coating composition according to claim 21, a portion of a cured coating formed which is capable of self-healing within 2 hours.

25. A coated article comprising
a substrate having at least one major surface; and
a cured coating formed from the coating composition according to claim 21 that is at least partially directly or indirectly applied on the major surface.

26. The coated article according to claim 25, wherein the substrate comprises wood, metal, plastic, ceramic, cementitious board, or combination thereof.

27. A Michael Addition curable composition, comprising:
at least one reactive donor capable of providing two or more nucleophilic carbanions;

at least one reactive acceptor comprising two or more carbon-carbon double bonds; and at least one catalyst for catalyzing a Michael Addition crosslinking reaction between the at least one reactive donor and the at least one reactive acceptor, wherein the at least one reactive donor comprises at least one branched polyester comprising at least one polyester backbone and at least one —C(O)—CH$_2$—C(O)-moiety;

wherein the at least one polyester backbone is derived from an alcohol component comprising at least one alcohol having at least three hydroxyl groups; and wherein the at least one branched polyester has a —C(O)—CH$_2$—C(O)-moiety equivalent in a range of 200-600 g/mol.

28. The curable composition of claim 27, wherein the at least one branched polyester comprises at least one polyester backbone derived from an alcohol component comprising at least one alcohol having at least three hydroxyl groups.

29. The curable composition of claim 27, wherein at least one —C(O)—CH$_2$—C(O)-moiety is covalently incorporated into the polyester backbone.

\* \* \* \* \*